(No Model.)

H. H. BAKER, Jr.
PANTALOONS FASTENER.

No. 439,372.  Patented Oct. 28, 1890.

Witnesses:
Theo. L. Popp.
Emil Neuhart.

H. H. Baker Jr. Inventor.
By Wilhelm Bonner
Attorneys.

UNITED STATES PATENT OFFICE.

HENRY H. BAKER, JR., OF BUFFALO, NEW YORK, ASSIGNOR OF ONE-HALF TO HARVEY D. BLAKESLEE, OF SAME PLACE.

PANTALOONS-FASTENER.

SPECIFICATION forming part of Letters Patent No. 439,372, dated October 28, 1890.

Application filed July 1, 1890. Serial No. 357,358. (No model.)

*To all whom it may concern:*

Be it known that I, HENRY H. BAKER, Jr., a citizen of the United States, residing at Buffalo, in the county of Erie and State of New York, have invented a new and useful Improvement in Pantaloons-Fasteners, of which the following is a specification.

This invention relates to the clasps or fasteners which are employed by bicycle-riders for holding the pantaloons tightly about the ankles, so as to prevent the same from becoming entangled with the cranks or the spokes of the adjacent wheel.

The object of my invention is to produce a convenient and reliable fastening which remains attached to the pantaloons, so as to be readily at hand when required, and which is concealed on the inside of the pantaloons when not in use.

Figure 1:
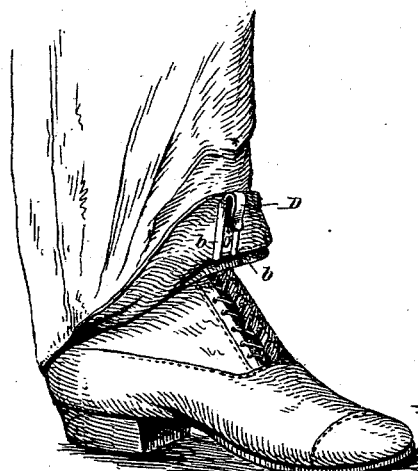
Figure 2:
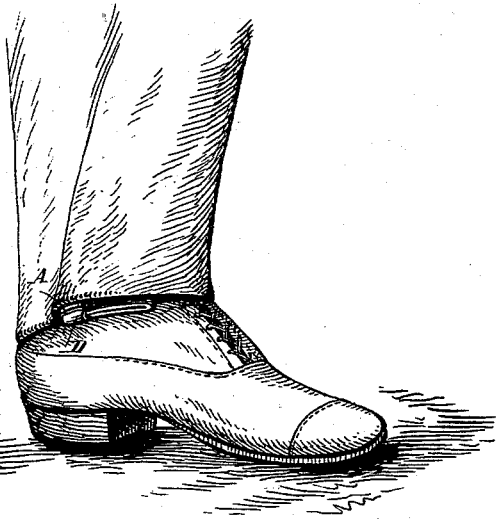
Figure 3:
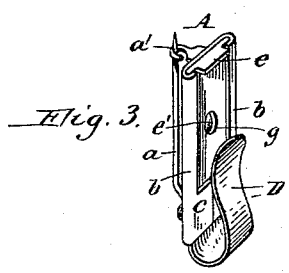
Figure 4:
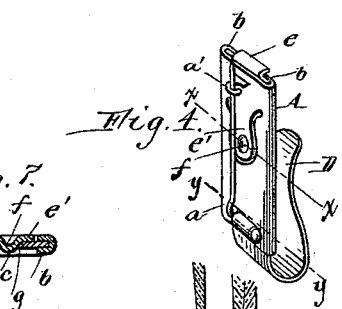
Figure 7:
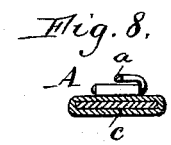
Figure 5:
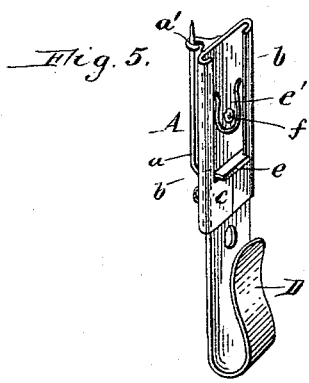
Figure 6:
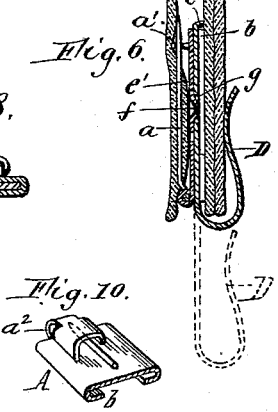
Figures 8, 9, 10:
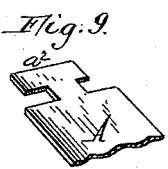

In the accompanying drawings, Figure 1 is a perspective view showing the manner of attaching the fastener to the pantaloons. Fig. 2 is a similar view showing a pantaloons-leg folded and secured in place by my improved fastener. Fig. 3 is a detached perspective view of the fastener viewed from its front side. Fig. 4 is a similar view thereof viewed from its rear side. Fig. 5 is a perspective view of the fastener with the sliding hook pulled downward in the position in which it is engaged under the edge of the pantaloons-leg. Fig. 6 is a longitudinal section of the fastener attached to the pantaloons-leg in the position in which the latter is tightened about the ankle. Figs. 7 and 8 are cross-sections of the clasp in lines $x\,x$ and $y\,y$, Fig. 4, respectively. Figs. 9 and 10 are fragmentary views of a modified construction of the fastener.

Like letters of reference refer to like parts in the several figures.

A represents the frame of the fastener, which consists of a rectangular plate, to the back of which are attached a pin $a$ and an open eye $a'$ for securing the fastener to the pantaloons. The frame or plate A is provided at its longitudinal edges with inwardly-turned lips or flanges $b$, the lower portions of which are formed with inward extensions which abut against each other and form with the plate a loop $c$.

D represents a hook arranged at the lower end of the frame A and made vertically movable thereon. The flat shank of this hook passes through the loop $c$ and is guided between the longitudinal flanges of the frame. The hook slides upon the plate A and may be pulled downwardly into the position represented in Fig. 5 or pushed upwardly into the position represented in Figs. 3, 4, and 6. The shank of the hook is prevented from being withdrawn from the loop $c$ by an outwardly-turned lip $e$, formed at the upper end of the shank and which strikes against the upper edge of the loop in the lowermost position of the hook, as represented in Fig. 5.

$e'$ represents a catch arranged on the frame A and adapted to interlock with the hook and retain the same in its raised position. This catch consists of a spring-tongue which is preferably cut out of the metal of the plate A, as shown, and provided on the inner side of its free end with a teat or projection $f$, which engages in an opening or indentation $g$, formed in the shank of the hook. The spring-catch possesses sufficient stiffness to retain the hook in an elevated position under ordinary circumstances, but is deflected and released from the hook upon pulling the same downwardly. Upon pressing the hook upwardly it is automatically locked in place by the spring-catch.

In applying the fastener the lower front end of the pantaloons-leg is turned up, as shown in Fig. 1, and the fastener is attached about centrally to this turned-up portion, with the hook at the top, as shown. The end of the pantaloons-leg is then turned down, the hook, which is now at the bottom, is pulled below the lower edge of the pantaloons-leg, and the front portion of the latter is doubled on the line of the fastener and folded backward against the outer side of the ankle. The hook, which now faces inwardly, is then engaged under the lower edge of the unfolded part of the pantaloons-leg and pushed upwardly into the position represented by full lines in Fig. 6, whereby only the extreme lower portion of the hook remains exposed. The pantaloons are by this means folded smoothly and tightly about the ankle and all unsightly bagging or gathering thereof is avoided.

The open eye $a'$ may be formed in one piece with the plate A by forming the upper end of the plate with an extension $a^2$, which is bent backwardly against the rear side of the plate to form the eye, as shown in Figs. 9 and 10.

When it is desired to release the fastener, the sliding hook is pushed downward and disengaged from the lower edge of the pantaloons-leg, after which it is again pressed upward inside of the pantaloons-leg, where it it hidden from view.

My improved fastener is very convenient, as it is always ready for use and does not require to be repeatedly attached and removed from the pantaloons, and when not in use it is invisible and occupies a place where it does not annoy the wearer.

The frame A, with its flanges and spring-catch, is stamped of a single piece of sheet metal, and the hook with its lip is also constructed of one piece, forming a very simple fastener, which is cheaply produced.

I claim as my invention—

1. In a pantaloons-fastener, the combination, with a rectangular frame provided on its rear side with a pin for attaching the fastener to the pantaloons and with a spring-catch and on its front side with inwardly-bent marginal flanges, of a vertically-sliding hook arranged at the lower end of the rectangular frame and having a flat shank guided between the flanges of the frame and provided with an opening or indentation with which the spring-catch of the frame engages, and with a stop which prevents withdrawal of the hook from the frame, substantially as set forth.

2. In a pantaloons-fastener, the combination, with a rectangular frame provided on its front side with inwardly-bent marginal flanges and on its rear side with a pin for attaching the fastener to the pantaloons and a spring tongue or catch formed integral with the frame and having a teat or projection, of a vertically-sliding hook arranged at the lower end of the rectangular frame and having a flat shank guided between the flanges of the frame and provided with an opening or indentation with which the projection of the spring-catch engages, and with a stop which prevents withdrawal of the hook from the frame, substantially as set forth.

3. In a pantaloons-fastener, the combination, with the frame provided on its rear side with a pin for attaching the fastener to the pantaloons and on its front side with a loop, of a hook adapted to engage under the lower edge of the pantaloons, having a shank sliding in said loop, and provided with a lip or projection which prevents withdrawal of the hook from said loop, and a spring-catch arranged on the frame, whereby the sliding hook is retained in an elevated position, substantially as set forth.

Witness my hand this 26th day of June, 1890.

HENRY H. BAKER, JR.

Witnesses:
CARL F. GEYER,
FRED. C. GEYER.